Figures 1, 2:
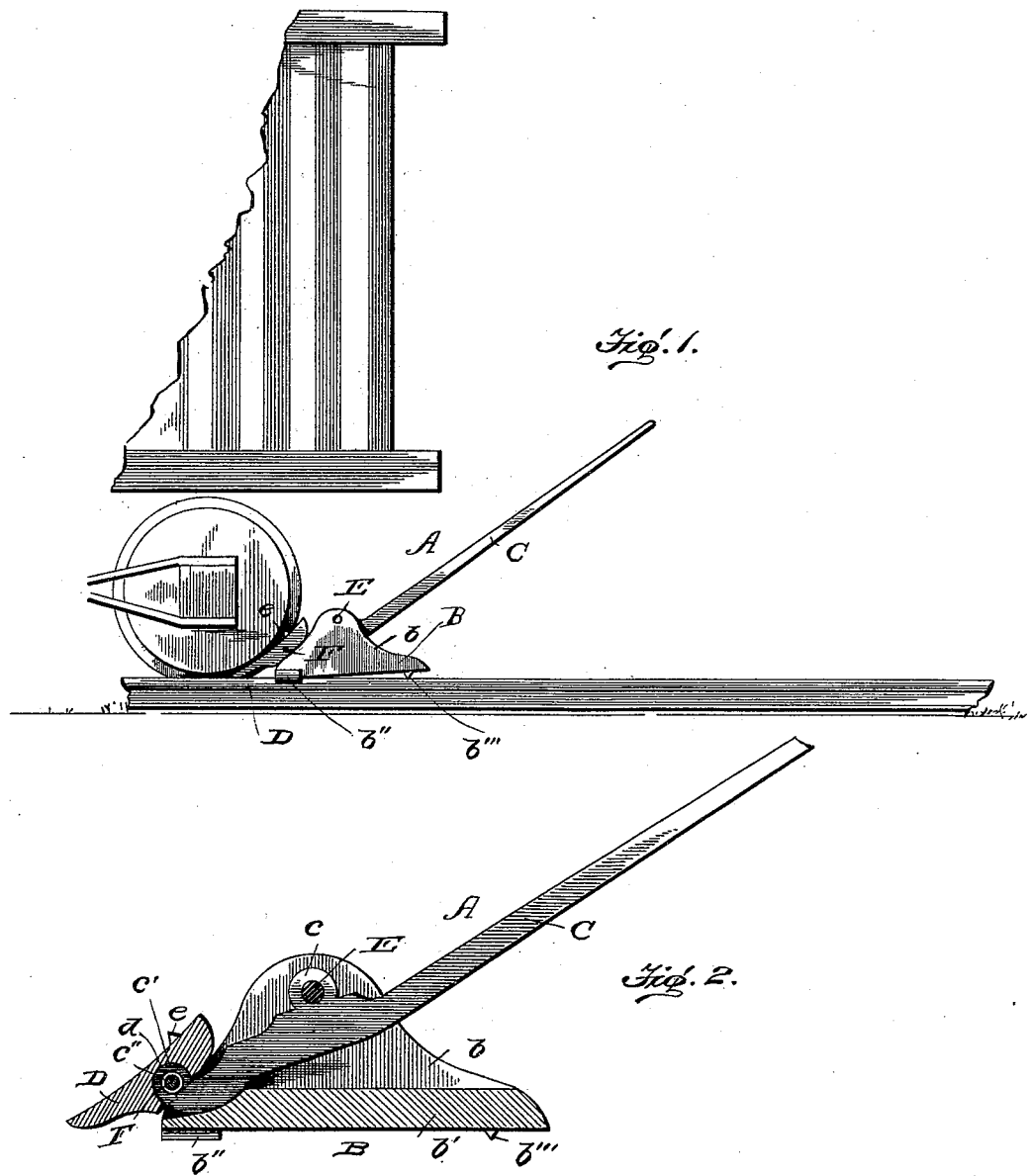

(No Model.)

S. C. CHASE.
CAR MOVER.

No. 493,615. Patented Mar. 14, 1893.

WITNESSES:

INVENTOR
Solomon C. Chase
BY Edson Bros
ATTORNEYS.

UNITED STATES PATENT OFFICE.

SOLOMON C. CHASE, OF NORTH BALTIMORE, OHIO.

CAR-MOVER.

SPECIFICATION forming part of Letters Patent No. 493,615, dated March 14, 1893.

Application filed January 12, 1893. Serial No. 458,131. (No model.)

*To all whom it may concern:*

Be it known that I, SOLOMON C. CHASE, a citizen of the United States, residing at North Baltimore, in the county of Wood and State of Ohio, have invented certain new and useful Improvements in Car-Movers; and I do hereby declare the following to be a full, clear, and exact description of the invention, such as will enable others skilled in the art to which it appertains to make and use the same.

My invention relates to an improvement in car moving implements of that class which employ a base designed to rest or bear upon the track and a lever fulcrumed in said base in a manner to exert power against the periphery of a wheel to effect the movement of the car on the track. In implements of this class, the lever has been fulcrumed to the base at a point about midway of the transverse axis of the lever, near one end thereof, and said lever has been made quite long, usually about seven feet, to give the necessary leverage for moving the car. It has been my experience that when an implement of this kind is used for moving an empty car against a preceding loaded car, the effect of the implement on the rear wheels of the empty car will be to raise the rear part of the car instead of moving the car forward.

The object of my invention is to provide an improved car mover which, in action, will impart to the wheel of a car a rolling motion to cause the wheels to turn and travel on the track instead of merely a direct thrust from the rear side of the wheel, and a further object is to so construct and arrange the parts that the length of the lever can be materially reduced or shortened without sacrificing the power of the lever.

With these and such other ends in view as pertain to my invention, it consists in the combination with a base, of a lever fulcrumed thereto near one end, and a thrust block pivoted to the free end of the lever in a manner to adapt its lower end to bear against the top of the rail and to serve as a fulcrum for thrust block when the lever is depressed and the upper part of the thrust block forcibly pressed against the periphery of the wheel. In order to give the thrust block such movement as will tend to impart to the wheel a turning or rotary movement, I fulcrum the lever at a point above the upper edge of the lever, or above its longitudinal axis, and by thus placing the fulcrum above the axis of the lever, and pivoting the thrust block to the free end of the lever, the upper part of the block is caused to have an oscillating movement in an upward and forward direction against the rear side of the car wheel, thereby giving to the wheel a rotary movement instead of an upward lift from the lower side of the wheel. By this implement, an empty car can be moved forward on the track if preceded by a loaded car, and said thrust block is provided with a transverse rib or flange near its upper end that takes against the wheel and prevents slipping of the thrust block on the wheel. The thrust block is provided with a transverse slot to receive the free end of the lever, and through the block and the lever passes a connecting pin that works in an enlarged hole or slot in the lever in order to permit the lever to bear against the upper solid part of the thrust block when in action, thus taking the strain off the connecting pin and bringing the solid parts of the lever and block in contact.

The base plate of my implement has raised sides or flanges in which the fulcrum shaft or pin of the lever is supported, and the front edges of these raised sides are curved to conform to the rear side of the thrust block and thus serve as bearings for said block when the lever is raised and the implement fitted on the track beneath a wheel, so that if the car should move backward when the implement is beneath the wheel the weight will rest on the thrust block and the solid sides of the base.

I have fully illustrated my improved car mover in the accompanying drawings, forming a part of this specification, and in which:—

Figure 1 is a side elevation with my implement fitted on a rail beneath one of the wheels of a car. Fig. 2 is an enlarged vertical sectional view through the implement detached from the rail.

Like letters of reference denote corresponding parts in both figures of the drawings, referring to which:

A designates my improved car moving implement, which consists of a base B, a lever C, and a thrust block D. This base B is made or cast in a single piece of metal, and it has the raised sides $b, b$, made integral with the flat base $b'$. At the forward end of the base, two depending flanges $b''$ are provided to clasp the sides of the rail of a railway-track, and at the rear end of the base a foot $b'''$ is formed on the lower face of the flat base $b'$ which rests on the rail and raises the rear end of the base, to enable the front end thereof to readily fit beneath the car wheel.

The lever C is fitted between the raised sides of the base B, and this lever is fulcrumed on a shaft E which is supported in the upper part of the raised sides and connected with the lever above the upper edge thereof. To provide for the convenient attachment of the lever and the shaft, a lug, or lugs, $c$ are formed integrally on the upper side of the lever, and these lugs have transverse aligned openings through which the shaft or pin E is passed, as indicated very clearly in Fig. 2. The lugs $c$ are formed on the lever a suitable distance from one end thereof, and the short end of the lever is enlarged or rounded at $c'$, through which enlarged end is formed a hole or slot $c''$. This enlarged or rounded end of the lever C is fitted in a slot or recess $d$ formed in the rear side of the thrust block D, and through the thrust block and the slot or enlarged opening in the lever passes a connecting pin F which serves to pivotally connect the thrust block to the inner short end of the lever. This connecting pin has a limited play or movement in the enlarged hole or slot of the lever, and when the device is in use the strain and weight on the thrust block and lever come on the solid parts of the lever and block instead of on the connecting pin F as the rounded end $c'$ of the lever takes or bears against the upper side of the thrust block, thus relieving the connecting pin and preventing the same from being broken.

The thrust block D is curved throughout its length and preferably tapered toward its lower end to enable the block to be fitted beneath the car wheel. The block is of such length, and the lever pivoted in the base, in a manner to enable the lower tapered end of the thrust block to rest on the top side of the rail when the device is in use, and said lower end of the block serves as a bearing point or fulcrum for the block when the lever is depressed and the upper part of the thrust block thrown forward and upward to apply force against the car wheel.

The thrust block is provided with a transverse rib $e$ near its upper end, and on the convex face thereof, and this rib is adapted to bear against the periphery of the wheel, to prevent the wheel or block from slipping.

The edges of the raised sides of the base B contiguous to the thrust block are curved to conform to the rear side of said block, and when the implement is inserted beneath the wheel and the lever is raised, the thrust block bears on these curved edges of the base. This is advantageous as the block has a firm bearing and support when the car moves backward as is frequently the case when the car is standing on a grade, or under other conditions.

The operation of my device may be described as follows: The implement is fitted on the track beneath the car wheel, the flanges $b''$ of the base serving to hold the implement from lateral displacement and the rear foot $b'''$ throwing the forward end of the implement well under the wheel. The lever is raised to the position indicated in Figs. 1 and 2 and the lower end of the thrust block rests on the rail, beneath the wheel, while the upper part of the thrust block and the rib $e$ thereof rests against the car wheel some distance above the rail. The lever is now depressed, and the inner short arm thereof is thus raised to impart to the thrust block an oscillating motion in an upward and forward direction, and this motion of the thrust block is applied against the wheel to impart to the latter a rolling motion in lieu of simply an upward thrust given by the ordinary implement. After the car has been moved, the implement is shoved forward and the operation repeated until the car is moved the desired distance on the rail.

Having thus fully described my invention, what I claim as new, and desire to secure by Letters Patent, is—

1. A car mover consisting of a base, a lever fulcrumed in said base, and a thrust block pivoted to the inner short arm of the lever and adapted to rest, at its lower edge, on a rail, for the purpose described, substantially as set forth.

2. A car mover, comprising a base, a lever fulcrumed to said base at a point above its longitudinal axis, and a thrust block pivoted to the inner end of the lever and adapted to rest, at its lower end, on a rail, whereby the upper part of the thrust block is given an oscillating motion in an upward and forward direction as the lever is depressed, substantially as set forth.

3. A car mover, comprising a base, a lever fulcrumed above its longitudinal axis to said base, a thrust block having a slot or recess in which the inner end of the lever is fitted, and a connecting pin between the lever and thrust block and capable of a limited play or movement in said lever or thrust block, substantially as described, for the purpose set forth.

4. A car mover, substantially such as described, comprising a base, a lever fulcrumed above its longitudinal axis to said base, and the thrust-block pivoted to the short arm of the lever and adapted to rest, at its lower free end, against a rail, said thrust-block provided near its upper part with the transverse rib adapted to bear against the periphery of a car-wheel as the thrust-block is oscillated in an upward and forward direction on depressing of the lever, as set forth.

5. A car mover comprising a base having the raised sides, the lever provided, on its upper side, with the aligned lugs which are fitted between said raised sides, the fulcrum pin supported in the raised sides and passing through the aligned lugs to pivot the lever, above its longitudinal axis, in said base, and a thrust block pivoted to the inner end of the lever, substantially as and for the purpose described.

6. In a car mover, the combination with a base, of the lever fulcrumed above its longitudinal axis to said base, and the thrust-block pivoted at an intermediate point of its length to the short arm of said lever and having its free lower end adapted to rest on the top of a rail, whereby as the lever is depressed the upper part of the thrust-block will be oscillated in an upward and forward direction to impart a rolling motion to a car-wheel, substantially as set forth.

In testimony whereof I affix my signature in presence of two witnesses.

SOLOMON C. CHASE.

Witnesses:
JOS. FORREST,
H. Q. BERNHARD.